US012385417B2

(12) United States Patent
Theratil et al.

(10) Patent No.: US 12,385,417 B2
(45) Date of Patent: Aug. 12, 2025

(54) DISRUPTING FLOW VORTICES TO ATTENUATE RESONANT TONES WITHIN A GAS TURBINE ENGINE

(71) Applicant: Pratt & Whitney Canada Corp., Longueuil (CA)

(72) Inventors: Ignatius Theratil, Mississauga (CA); Daniel Alecu, Brampton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/227,645

(22) Filed: Jul. 28, 2023

(65) Prior Publication Data

US 2025/0035012 A1   Jan. 30, 2025

(51) Int. Cl.
  *F01D 25/04*  (2006.01)
  *F01D 11/00*  (2006.01)
  *F01D 25/18*  (2006.01)

(52) U.S. Cl.
  CPC .............. *F01D 25/04* (2013.01); *F01D 11/00* (2013.01); *F01D 25/18* (2013.01); *F01D 25/183* (2013.01); *F05D 2220/323* (2013.01); *F05D 2240/55* (2013.01); *F05D 2260/96* (2013.01); *F05D 2260/98* (2013.01)

(58) Field of Classification Search
  CPC ........ F01D 25/04; F01D 25/16; F01D 25/162; F01D 25/18; F01D 25/183; F01D 11/00; F01D 11/001; F01D 11/02; F16J 15/44; F16J 15/441; F05D 2220/323; F05D 2240/55; F05D 2260/96; F05D 2260/98
  See application file for complete search history.

(56) References Cited

U.S. PATENT DOCUMENTS

| 3,321,910 A * | 5/1967 | Davies .................. F01D 25/125 |
| | | 184/104.1 |
| 5,301,957 A | 4/1994 | Hwang |
| 10,100,672 B2 | 10/2018 | Vdoviak, Jr. |
| 2004/0179935 A1 | 9/2004 | Maguire |
| 2008/0029167 A1 * | 2/2008 | Eastwick ............ F16C 33/6685 |
| | | 137/561 A |

(Continued)

FOREIGN PATENT DOCUMENTS

JP   03369361 B2   1/1997

OTHER PUBLICATIONS

EP Search Report for EP Patent Application No. 24191261.7 dated Jan. 28, 2025.

*Primary Examiner* — Elton K Wong
(74) *Attorney, Agent, or Firm* — Getz Balich LLC

(57) ABSTRACT

An assembly is provided for a gas turbine engine. This assembly includes a rotating structure of the gas turbine engine, a stationary structure of the gas turbine engine and a volume formed by and extending between the rotating structure and the stationary structure. The rotating structure is rotatable about an axis. The rotating structure includes a seal land and a fluid nozzle. The stationary structure includes a seal element. The seal element is arranged with the seal land to form a seal assembly that seals an annular gap between the stationary structure and the rotating structure. The volume is adjacent the seal element and the seal land. The fluid nozzle is configured to direct a fluid jet out from the rotating structure and into the volume.

19 Claims, 6 Drawing Sheets

(56) References Cited

U.S. PATENT DOCUMENTS

| | | | |
|---|---|---|---|
| 2008/0089783 A1* | 4/2008 | Addis | F16J 15/445 |
| | | | 415/170.1 |
| 2011/0223003 A1* | 9/2011 | Olennikov | F01D 11/003 |
| | | | 415/180 |
| 2013/0241153 A1 | 9/2013 | Garrison | |
| 2016/0032771 A1* | 2/2016 | Vdoviak, Jr. | F01D 25/183 |
| | | | 277/358 |
| 2016/0238137 A1* | 8/2016 | Clark | F16C 37/00 |
| 2020/0116047 A1 | 4/2020 | Theratil | |
| 2021/0079802 A1 | 3/2021 | Smith | |
| 2021/0207495 A1* | 7/2021 | Binek | F01D 25/18 |
| 2021/0332775 A1* | 10/2021 | Yuen | F01D 25/162 |
| 2022/0049623 A1* | 2/2022 | Campo | F01D 25/20 |

* cited by examiner

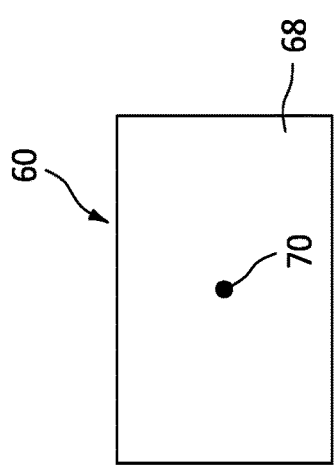
FIG. 7
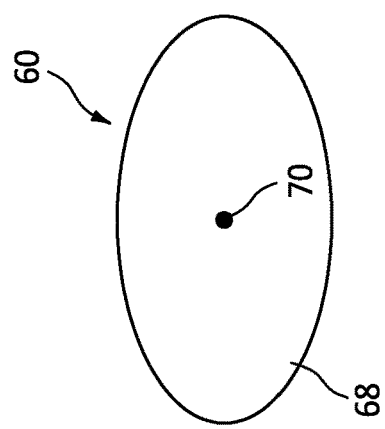
FIG. 6
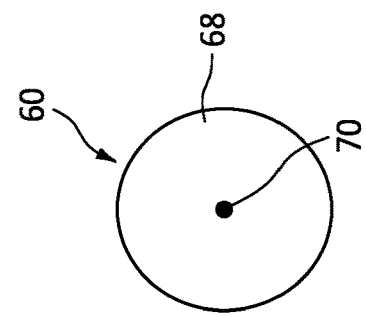
FIG. 5
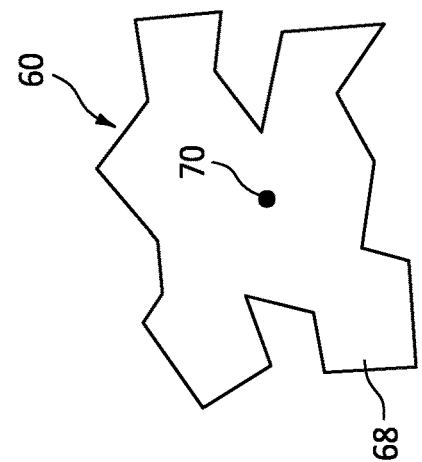
FIG. 10
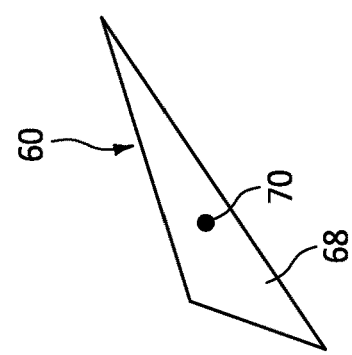
FIG. 9
FIG. 8

DISRUPTING FLOW VORTICES TO ATTENUATE RESONANT TONES WITHIN A GAS TURBINE ENGINE

TECHNICAL FIELD

This disclosure relates generally to a gas turbine engine and, more particularly, to attenuating noise within the gas turbine engine.

BACKGROUND INFORMATION

A gas turbine engine includes various sources for engine noise. Various techniques and methodologies are known in the art for reducing engine noise. While these known noise reduction techniques and methodologies have various benefits, there is still room in the art for improvement.

SUMMARY

According to an aspect of the present disclosure, an assembly is provided for a gas turbine engine. This assembly includes a rotating structure of the gas turbine engine, a stationary structure of the gas turbine engine and a volume formed by and extending between the rotating structure and the stationary structure. The rotating structure is rotatable about an axis. The rotating structure includes a seal land and a fluid nozzle. The stationary structure includes a seal element. The seal element is arranged with the seal land to form a seal assembly that seals an annular gap between the stationary structure and the rotating structure. The volume is adjacent the seal element and the seal land. The fluid nozzle is configured to direct a fluid jet out from the rotating structure and into the volume.

According to another aspect of the present disclosure, another assembly is provided for a gas turbine engine. This assembly includes a rotating structure of the gas turbine engine, a stationary structure of the gas turbine engine, a volume and a fluid nozzle. The rotating structure is rotatable about an axis. The rotating structure includes a seal land. The stationary structure includes a seal element. The seal element is arranged with the seal land to form a seal assembly that seals an annular gap between the stationary structure and the rotating structure. The volume is formed by and extends between the rotating structure and the stationary structure. The volume is adjacent the seal element and the seal land. The fluid nozzle includes a nozzle passage and a nozzle orifice. The fluid nozzle is configured to direct a fluid out of the nozzle passage, through the nozzle orifice, and into the volume as a diffuse flow of the fluid.

According to still another aspect of the present disclosure, another assembly is provided for a gas turbine engine. This assembly includes a rotating structure of the gas turbine engine, a stationary structure of the gas turbine engine, a volume and a fluid nozzle. The rotating structure is rotatable about an axis. The rotating structure includes a seal land. The stationary structure includes a seal element. The seal element is arranged with the seal land to form a seal assembly that seals an annular gap between the stationary structure and the rotating structure. The volume is formed by and extends between the rotating structure and the stationary structure. The volume is adjacent the seal element and the seal land. The fluid nozzle includes a nozzle passage and a nozzle orifice. The fluid nozzle is configured to direct a fluid out of the nozzle passage, through the nozzle orifice, and into the volume as a turbulent flow of the fluid.

The nozzle passage may follow a curved trajectory to the nozzle orifice.

The rotating structure may include the fluid nozzle.

The stationary structure may include the fluid nozzle.

A width of the nozzle passage may expand as the nozzle passage extends longitudinally towards the nozzle orifice.

The nozzle orifice may have a non-circular cross-sectional geometry.

The fluid nozzle may be configured to direct the fluid jet into the volume to disrupt flow vortices within the volume.

The fluid nozzle may include a nozzle passage and a nozzle orifice fluidly coupling the nozzle passage to the volume. The nozzle passage may taper as the nozzle passage extends longitudinally away from the nozzle orifice.

The fluid nozzle may include a diffuser section configured to diffuse the fluid jet directed into the volume.

The fluid nozzle may include a nozzle passage and a nozzle orifice fluidly coupling the nozzle passage to the volume. The nozzle passage may extend longitudinally along a centerline to the nozzle orifice. At least a portion of the centerline that extends longitudinally to the nozzle orifice may be curved.

The fluid nozzle may include a nozzle passage and a nozzle orifice fluidly coupling the nozzle passage to the volume. The nozzle orifice may have an elongated cross-sectional geometry.

The fluid nozzle may include a nozzle passage and a nozzle orifice fluidly coupling the nozzle passage to the volume. The nozzle orifice may have a polygonal cross-sectional geometry.

The fluid nozzle may include a nozzle passage and a nozzle orifice fluidly coupling the nozzle passage to the volume. The nozzle orifice may have an irregular cross-sectional geometry.

The fluid nozzle may be configured to direct the fluid jet in a direction towards the seal assembly.

The fluid nozzle may be configured to direct the fluid jet in a direction away from the seal assembly.

The assembly may also include a lubricant source fluidly coupled to the fluid nozzle. The fluid jet may be configured as or otherwise include a lubricant jet.

The assembly may also include an air source fluidly coupled to the fluid nozzle. The fluid jet may be configured as or otherwise include an air jet.

The volume may be configured as or otherwise include an air passage extending to the seal assembly.

The volume may be configured as or otherwise include an air cavity.

The assembly may also include a bearing rotatably coupling the rotating structure to the stationary structure. The volume may be configured as or otherwise include a bearing compartment in which the bearing is disposed.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 5-10 are illustrations of various nozzle orifice geometries for the fluid nozzles.

DETAILED DESCRIPTION

Figure 1:
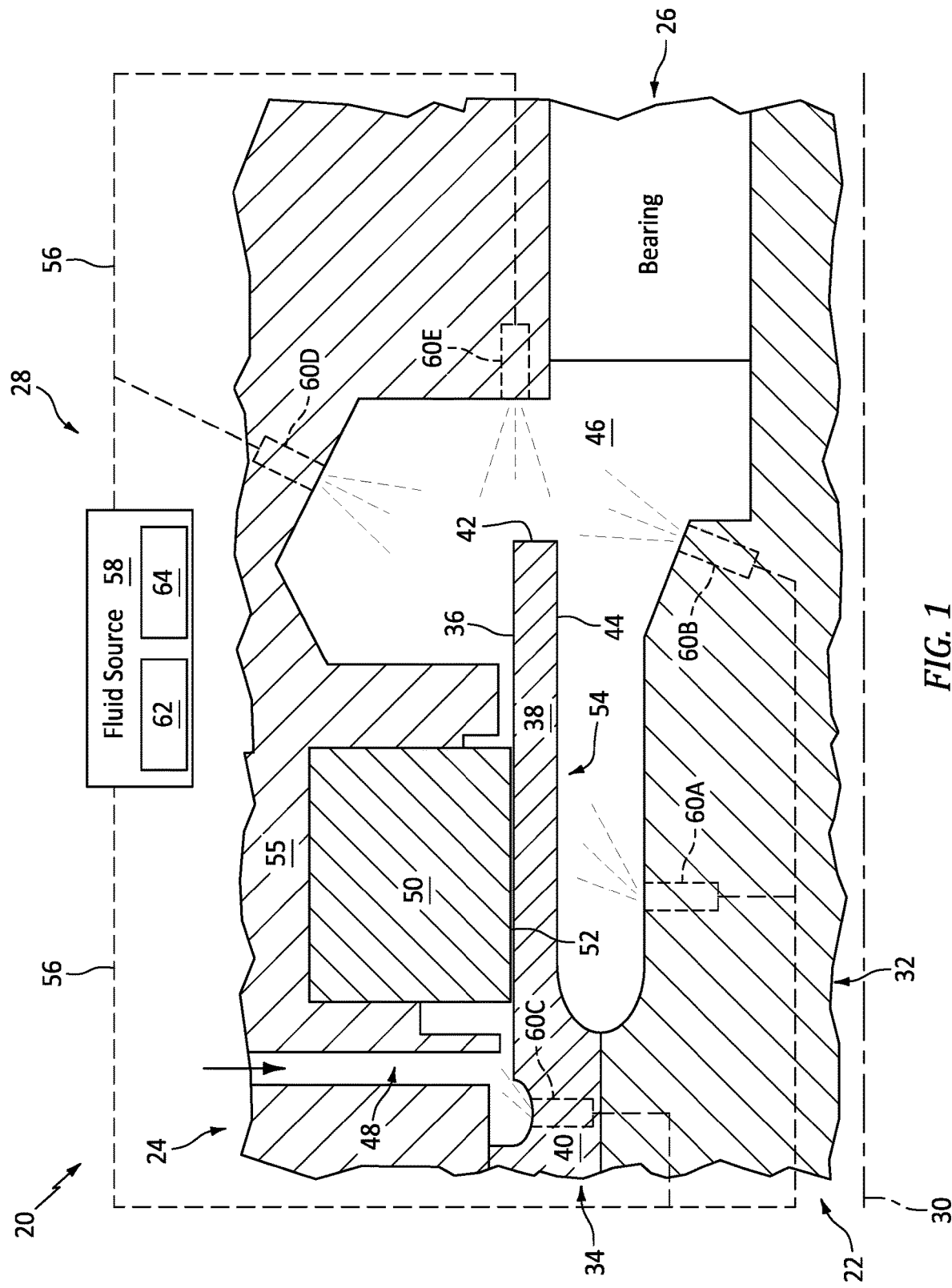
FIG. 1 is a partial schematic illustration of an assembly for a gas turbine engine.

FIG. 1 illustrate an assembly 20 of a gas turbine engine. Briefly, the gas turbine engine may be configured as part of a propulsion system for an aircraft. This aircraft may be an airplane, a helicopter, a drone (e.g., an unmanned aerial vehicle (UAV)) or any other manned or unmanned aerial vehicle or system. The gas turbine engine may also or alternatively be configured as part of an electrical power system for the aircraft. The engine assembly 20 of FIG. 1 includes a rotating structure 22 of the gas turbine engine, a stationary structure 24 of the gas turbine engine and at least one bearing 26 rotatably supporting the rotating structure 22 relative to the stationary structure 24. This engine assembly 20 also includes a fluid system 28.

The rotating structure 22 is rotatable about a rotational axis 30, which rotational axis 30 may also be a centerline axis of the rotating structure 22 and the stationary structure 24. The rotating structure 22 of FIG. 1 includes an engine shaft 32 and a seal land 34. The engine shaft 32 extends axially along the axis 30. The seal land 34 is connected to and rotatable with the engine shaft 32. The seal land 34 of FIG. 1, for example, is directly mounted (e.g., mechanically fastened, bonded or otherwise attached) to the engine shaft 32. The seal land 34, however, may alternatively be indirectly mounted to the engine shaft 32 through one or more other intermediate components which are also connected to and rotatable with the engine shaft 32. Still alternatively, the seal land 34 may be formed integral with the engine shaft 32. Referring again to FIG. 1, the seal land 34 extends circumferentially around and axially along the engine shaft 32, thereby circumscribing the engine shaft 32.

The seal land 34 includes a seal land surface 36. The seal land surface 36 may be configured as a cylindrical surface. The seal land surface 36 of FIG. 1, for example, extends axially along and circumferentially around the axis 30. This seal land surface 36 has a circular cross-sectional geometry when viewed in a reference plane perpendicular to the axis 30. The seal land surface 36 of FIG. 1 is further configured as an outer surface of the seal land 34. The seal land 34 of FIG. 1, for example, projects radially outward (e.g., in a direction away from the axis 30) to the seal land surface 36. This seal land surface 36 may be formed by/carried on a seal runner 38 (e.g., a flange) of the seal land 34. The seal runner 38 of FIG. 1 is cantilevered from a base 40 of the seal land 34. More particularly, the seal runner 38 projects axially out from the seal land base 40 to an unsupported axial distal end 42 of the seal runner 38. The seal runner 38 extends radially between and to an inner side surface 44 of the seal runner 38 and the seal land surface 36. The seal land 34 of the present disclosure, however, is not limited to such an exemplary arrangement.

The stationary structure 24 is configured to form one or more enclosed or open volumes (e.g., cavities, passages, etc.) with the rotating structure 22, which volumes are located internally within the gas turbine engine. The stationary structure 24 of FIG. 1, for example, is disposed radially outboard of the rotating structure 22. The stationary structure 24 extends axially along the rotating structure 22, thereby axially overlapping at least a portion or an entirety of the rotating structure 22. The stationary structure 24 extends circumferentially around (e.g., circumscribes) the rotating structure 22. With this arrangement, a bearing compartment 46 (or another air cavity) and an air passage 48 are collectively formed by and extend between at least (or only) the stationary structure 24 and the rotating structure 22 of FIG. 1.

The stationary structure 24 includes an annular seal element 50; e.g., a carbon seal element. This seal element 50 includes a seal element surface 52. The seal element surface 52 may be configured as a cylindrical surface. The seal element surface 52 of FIG. 1, for example, extends axially along and circumferentially around the axis 30. This seal element surface 52 has a circular cross-sectional geometry when viewed in a reference plane perpendicular to the axis 30. The seal element surface 52 of FIG. 1 is further configured as an inner surface of the seal element 50. The seal element 50 of FIG. 1, for example, projects radially inward (e.g., in a direction towards the axis 30) to the seal element surface 52.

The seal element 50 and its seal element surface 52 are aligned with and configured to sealingly engage the seal land 34 and its seal land surface 36. The seal element surface 52 of FIG. 1, for example, is disposed radially outboard of the seal land surface 36. This seal element surface 52 axially overlaps and circumscribes the seal land surface 36. The seal element 50 and its seal element surface 52 are adjacent and radially contact the seal land 34 and its seal land surface 36. With this arrangement, at least (or only) the seal element 50 and the seal land 34 collectively form a seal assembly 54. The seal assembly 54 of FIG. 1 is disposed axially between the bearing compartment 46 from the air passage 48. The seal assembly 54 is configured to seal an annular gap radially between the stationary structure 24 and the rotating structure 22. The seal assembly 54 may thereby substantially fluidly decouple the bearing compartment 46 from the air passage 48.

The seal element 50 is moveably mounted with another stationary component 55 (e.g., a frame, a strut, etc.) of the stationary structure 24. In particular, while the seal element 50 is restrained from rotating circumferentially about the axis 30 (e.g., rotationally stationary), the seal element 50 may be operable to shift radially and/or axially relative to the stationary component 55 to accommodate thermally induced and/or vibrationally induced movement (e.g., shifting) between the rotating structure 22 and the stationary structure 24. The seal element 50 may further be operable to shift to maintain contact with the seal land 34 as material of the seal element 50 is worn away during gas turbine engine operation. Various mounting techniques are known in the art for mounting a seal element with a stationary structure, and the present disclosure is not limited to any particular ones thereof.

The seal assembly 54 is described above as a radial seal assembly between the rotating structure 22 and the stationary structure 24. The present disclosure, however, is not limited to such an exemplary arrangement. The seal assembly 54, for example, may alternatively be configured as an axial seal assembly which seals an axial gap between the rotating structure 22 and the stationary structure 24. Moreover, while the seal assembly 54 is described above as a contact seal assembly where the seal land 34 contacts and rubs against the seal element 50, the present disclosure is not limited thereto. The seal assembly 54, for example, may alternatively be configured as a non-contact seal assembly such as, but not limited to, a hydrostatic seal assembly or a hydrodynamic seal assembly, where the seal element 50 may be sealingly engaged with, but not contact, the seal land 34.

Referring again to FIG. 1, the bearing 26 is arranged (e.g., housed) within the bearing compartment 46. This bearing 26 rotatably couples the rotating structure 22 to the stationary structure 24. Examples of the bearing 26 include, but are not limited to, a rolling element bearing and a journal bearing.

During operation of the engine assembly 20, the rotating structure 22 rotates about the axis 30 and relative to the stationary structure 24. While the seal assembly 54 substantially seals the gap between the stationary structure 24 and the rotating structure 22, some gas (e.g., compressed air) may leak across the seal assembly 54 between the air passage 48 and the bearing compartment 46. Some compressed air flowing in the air passage 48, for example, may leak across the seal assembly 54 (e.g., radially between the seal land surface 36 and the seal element surface 52) and flow into the bearing compartment 46. If unmitigated, this leakage air may swirl within the bearing compartment 46 and generate (e.g., strong) resonant tones; e.g., whistling noise. In addition, pressure waves may also be directed upstream into the air passage 48 and generate additional resonant tones. The fluid system 28 of the present disclosure is configured to disrupt the leakage air within the bearing compartment 46 and/or the pressure waves within the air passage 48 to at least partially attenuate the resonant tones.

The fluid system 28 of FIG. 1 includes a fluid circuit 56, a fluid source 58 and one or more fluid nozzles 60A-E (generally referred to as "60"). The fluid circuit 56 may include a system of circuit passages between the fluid source 58 to the fluid nozzles 60. This fluid circuit 56 and its circuit passages fluidly couple an outlet (or outlets) from the fluid source 58 to inlets into the fluid nozzles 60 (e.g., in parallel).

The fluid source 58 is configured to provide a fluid (e.g., a gas and/or a liquid) to the fluid circuit 56. The fluid source 58, for example, may be a lubricant source and the fluid may be lubricant; e.g., engine oil. This lubricant source may include a lubricant reservoir 62 (e.g., a lubricant tank) and/or a lubricant flow regulator 64 (e.g., a pump and/or a valve (or system of valves)). The lubricant reservoir 62 is configured to contain a quantity of the lubricant before, during and/or after gas turbine engine operation. The lubricant flow regulator 64 is configured to direct a flow of the lubricant to the fluid nozzles 60 through the fluid circuit 56. In another example, the fluid source 58 may be an air source and the fluid may be air; e.g., compressed air. This air source may be configured as a bleed orifice fluidly coupled with a flowpath within the gas turbine engine; e.g., a core flowpath. The bleed orifice is configured to bleed the air from the flowpath, and direct the bleed air into the fluid circuit 56 for delivery to the fluid nozzles 60. This bleed orifice may bleed the air from a portion of the flowpath extending through a compressor section of the gas turbine engine, or a portion of the flowpath downstream of the compressor section. The present disclosure, however, is not limited to such exemplary fluid sources nor to such exemplary fluids.

Each of the fluid nozzles 60 is configured to direct a jet of the fluid into a respective one of the internal volumes 46, 48. While the fluid jet may (or may not) provide a secondary cooling effect to one or more engine components, the fluid jet is (e.g., primarily) directed into the respective internal volume 46, 48 to disrupt flow vortices within the respective internal volume 46, 48 and attenuate associated resonant tones. For example, rather than directing a high velocity jet through the respective internal volume 46, 48 to impingement cool a component surface, the fluid jet may be a relatively low velocity jet that penetrates (e.g., partially) into the respective internal volume 46, 48. The fluid jet may also be a relatively diffuse and/or turbulent flow of the fluid to expand coverage and/or enhance disruption of the flow vortices. More particularly, the fluid jet is directed into the respective internal volume 46, 48 to change a frequency and/or a strength of the flow vortices to generate lower level, wide ranging broadband frequencies rather than the (e.g., strong) resonant tones which would otherwise be generated by the flow vortices.

One or more of the fluid nozzles (e.g., 60A-C) may each be mounted to, included as part of and/or otherwise configured with the rotating structure 22. The fluid nozzle 60A, for example, is radially below and axially aligned with the seal runner 38. This fluid nozzle 60A is configured to direct its fluid jet into the bearing compartment 46 in a direction generally (e.g., radially) towards the seal assembly 54 and its seal runner 38. The fluid nozzle 60B may also be located radially inboard of the seal runner 38. This fluid nozzle 60B, however, is configured to direct its fluid jet into the bearing compartment 46 in a direction (e.g., axially) away from the seal assembly 54 and its seal runner 38. The fluid nozzle 60B, for example, may direct its fluid jet into (or towards) a region of the bearing compartment 46 axially between the axial distal end 42 of the seal runner 38 and the stationary structure 24. The fluid nozzle 60C, on the other hand, may be generally radially aligned with (or outboard of) the seal runner 38. This fluid nozzle 60C is configured to direct its fluid jet into the air passage 48 in a direction (e.g., axially) towards the seal assembly 54 and its seal element 50. The present disclosure, however, is not limited to the foregoing exemplary fluid nozzle locations nor to the foregoing exemplary fluid jet trajectories.

One or more of the fluid nozzles (e.g., 60D and 60E) may each be mounted to, included as part of and/or otherwise configured with the stationary structure 24. The fluid nozzle 60D, for example, is radially outboard of the seal runner 38. This fluid nozzle 60D is configured to direct its fluid jet into the bearing compartment 46 in a direction generally (e.g., radially and/or axially) towards the seal assembly 54 and its seal runner 38. The fluid nozzle 60E, on the other hand, may be generally radially aligned with (or inboard of) the seal runner 38. This fluid nozzle 60E is configured to direct its fluid jet into the bearing compartment 46 in a direction (e.g., axially) towards the seal assembly 54 and its seal runner 38. The fluid nozzle 60E, for example, may direct its fluid jet into (or towards) a region of the bearing compartment 46 axially between the axial distal end 42 of the seal runner 38 and the stationary structure 24. The present disclosure, however, is not limited to the foregoing exemplary fluid nozzle locations nor to the foregoing exemplary fluid jet trajectories.

Figure 2:
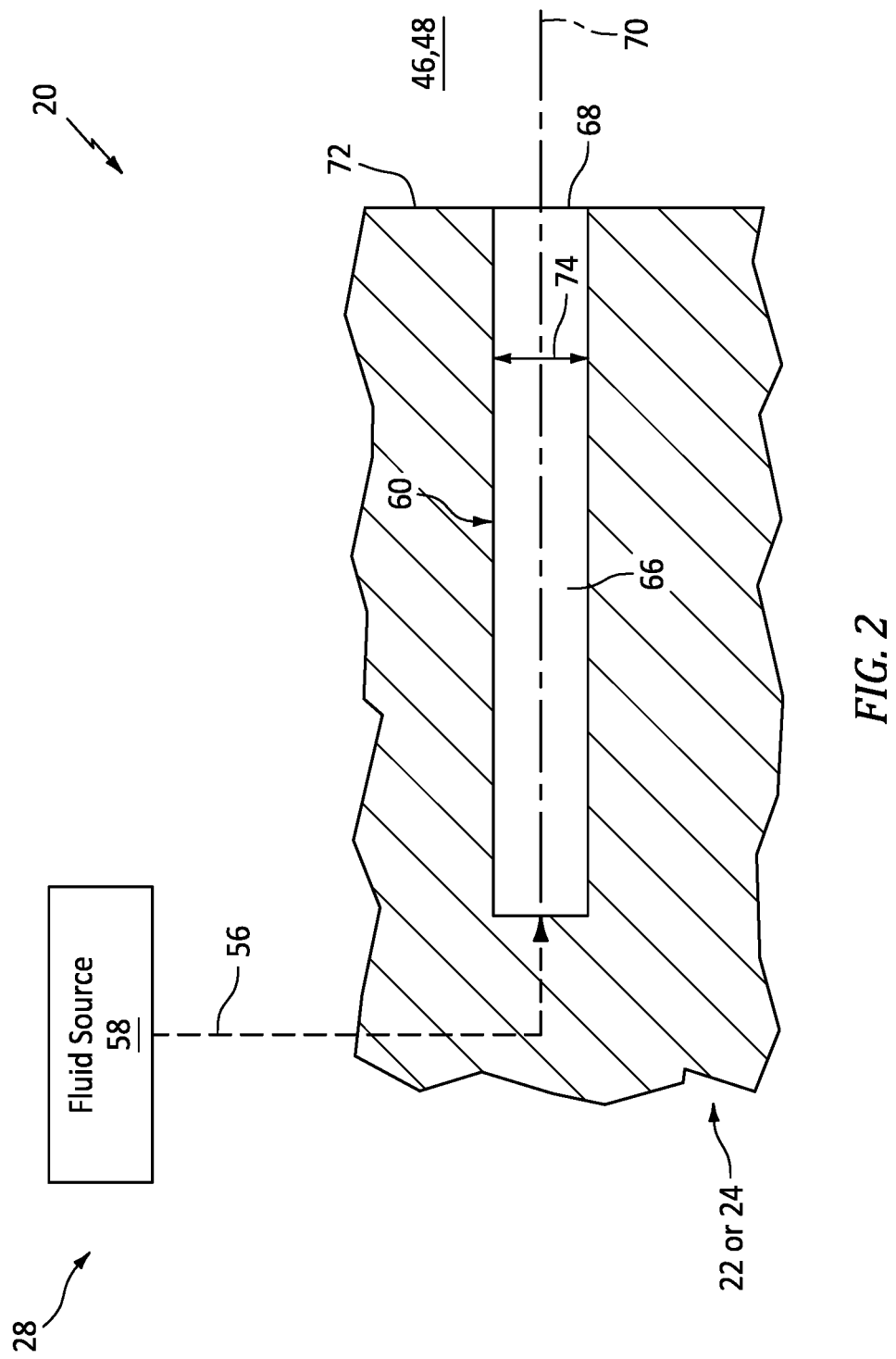
FIGS. 2-4 are schematic illustrations of a portion of the engine assembly with various fluid nozzle arrangements.
Figure 3:
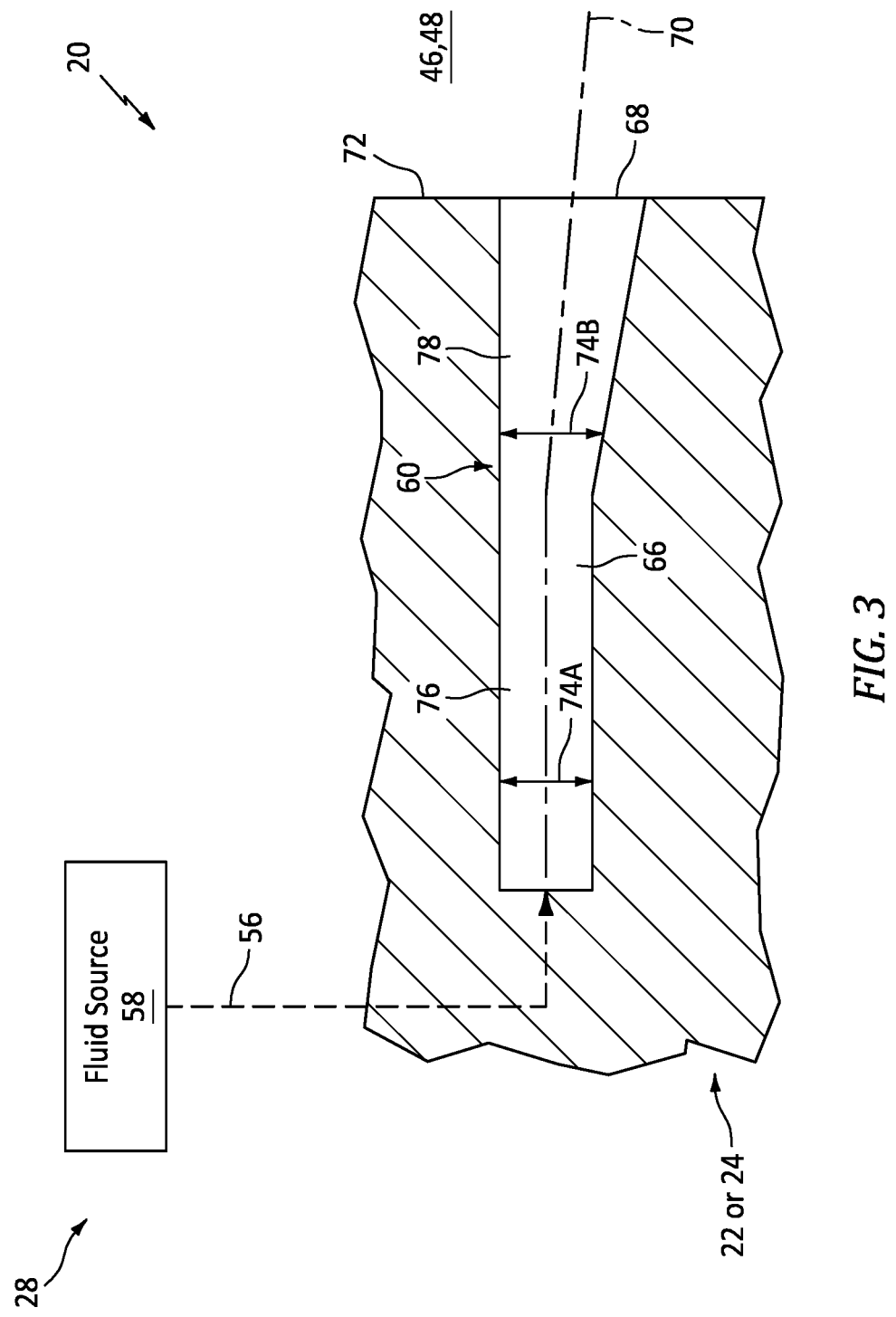
Figure 4:
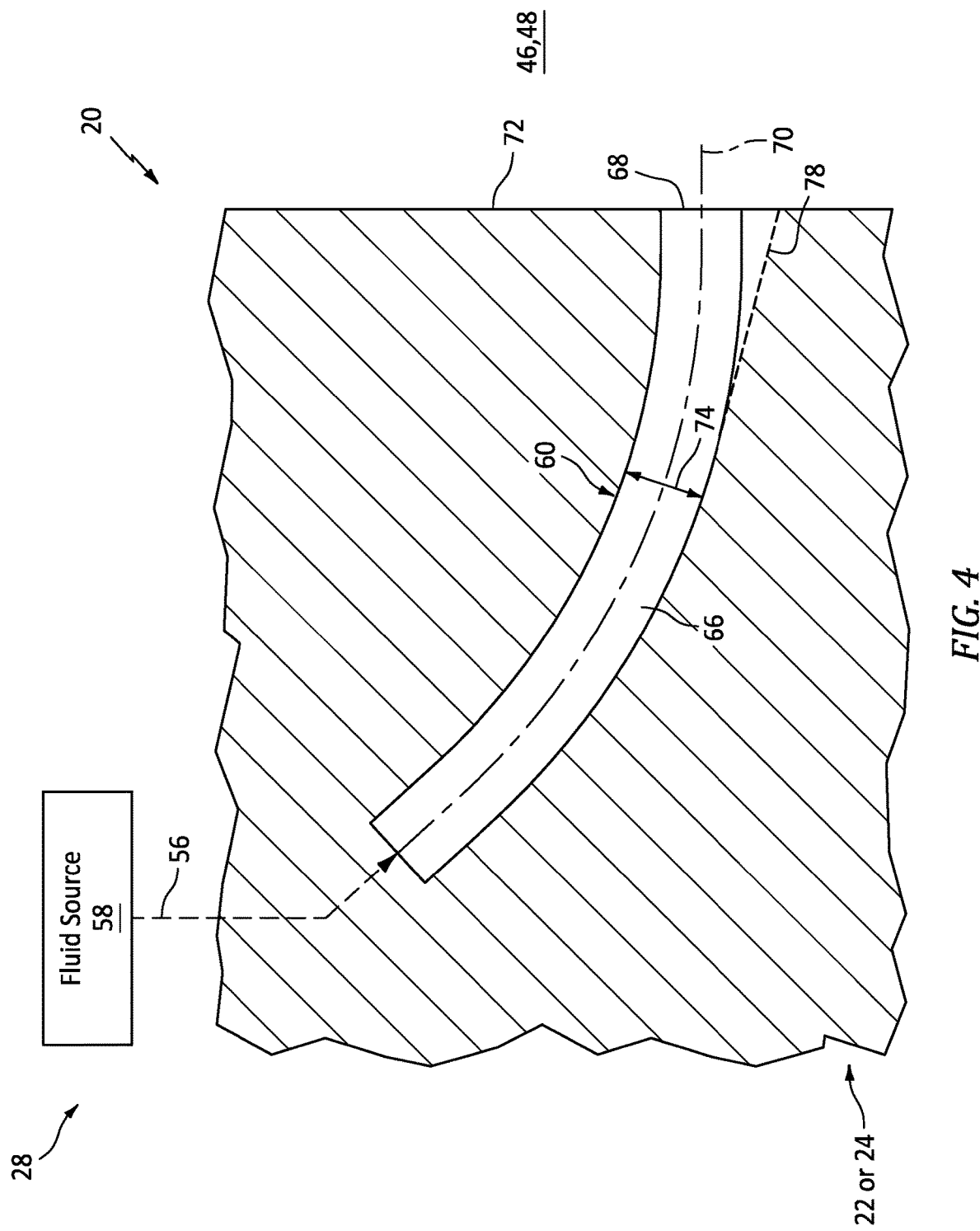

Referring to FIGS. 2-4, each fluid nozzle 60 may include a nozzle passage 66 and a nozzle orifice 68. The nozzle passage 66 extends longitudinally along a longitudinal centerline 70 of the respective fluid nozzle 60 in the respective structure 22, 24 (or another component connected to the respective structure) to the nozzle orifice 68. This nozzle orifice 68 is disposed in a surface 72 of the respective structure 22, 24 (or the other component connected to the respective structure), which structure surface 72 forms a (e.g., axial and/or radial) peripheral boundary of the respective internal volume 46, 48 into which the fluid jet is directed. The nozzle passage 66 is fluidly coupled with the fluid circuit 56. The fluid nozzle 60 is configured to direct the fluid received from the fluid circuit 56 out of the nozzle passage 66, through the nozzle orifice 68, and into the respective internal volume 46, 48 as the fluid jet.

In some embodiments, referring to FIG. 2, the nozzle passage 66 and the nozzle centerline 70 of one or more of the fluid nozzles 60 may each follow a straight, linear trajectory (e.g., from the fluid circuit 56) to the nozzle orifice 68. The nozzle passage 66 may also be configured with a uniform size 74 (e.g., a cross-sectional area, a lateral width, a diameter, etc.) longitudinally along at least a portion or an entirety of the nozzle centerline 70 to the nozzle orifice 68.

In some embodiments, referring to FIG. 3, the nozzle passage 66 of one or more of the fluid nozzles 60 may each include a diffuser. The nozzle passage 66 of FIG. 3, for example, includes a meter section 76 and a diffuser section 78. The meter section 76 extends longitudinally along the nozzle centerline 70 (e.g., from the fluid circuit 56) to the diffuser section 78. This meter section 76 may be configured with a uniform size 74A longitudinally along its length to the diffuser section 78. The diffuser section 78 extends longitudinally along the nozzle centerline 70 from the meter section 76 to the nozzle orifice 68. This diffuser section 78 is configured with a size 74B that changes (e.g., continuously or incrementally increases) longitudinally along its length from the meter section 76 to the nozzle orifice 68. With this arrangement, the nozzle passage 66 and its diffuser section 78 of FIG. 3 laterally tapers as the nozzle passage 66 extends longitudinally along its nozzle centerline 70 away from the nozzle orifice 68/to the meter section 76. This diffuser section 78 is configured to diffuse the fluid being directed into the respective internal volume 46, 48 so as to provide a diffused fluid jet; e.g., a jet of fluid that spreads/fans outward relative to the nozzle centerline 70. This diffusing the fluid jet increases a coverage area of the fluid jet as well as reduces the velocity and/or penetration of the fluid jet into the respective internal volume 46, 48. With the arrangement of FIG. 3, the nozzle centerline 70 may also follow a non-straight (e.g., a bent, compound, etc.) trajectory to the nozzle orifice 68.

In some embodiments, referring to FIG. 4, the nozzle passage 66 and the nozzle centerline 70 of one or more of the fluid nozzles 60 may each follow a non-straight trajectory (e.g., from the fluid circuit 56) to the nozzle orifice 68. The nozzle passage 66 and the nozzle centerline 70 of FIG. 4, for example, follows a curved trajectory (e.g., an arcuate trajectory, a splined trajectory, etc.) from or about the fluid circuit 56 to or about the nozzle orifice 68. With this arrangement, the fluid jet may be swirled into the respective internal volume 46, 48; e.g., the fluid jet may be a turbulent flow (e.g., a pulsing flow) of the fluid. This turbulent flow may facilitate wider ranging frequency modifications to the flow vortices within the respective internal volume 46, 48. In some embodiments, the nozzle passage 66 may also be configured with a uniform size 74 longitudinally along at least a portion or an entirety of the nozzle centerline 70 to the nozzle orifice 68. In other embodiments (see dashed line), the nozzle passage 66 may be configured with a size 74 that changes (e.g., continuously or incrementally increases) longitudinally along its length to the nozzle orifice 68. The nozzle passage 66 of FIG. 4, for example, may be configured with a diffuser similar to that described above with respect to FIG. 3.

Referring to FIGS. 5-10, each nozzle orifice 68 has a cross-sectional geometry ("orifice geometry") when viewed in a reference plane perpendicular to its nozzle centerline 70. Referring to FIG. 5, the orifice geometry for one or more of the fluid nozzles 60 may have a circular shape. Referring to FIGS. 6, 7 and 9, the orifice geometry for one or more of the fluid nozzles 60 may have an elongated shape; e.g., an oval shape (see FIG. 6), a rectangular shape (see FIG. 7), a triangular shape (see FIG. 9), etc. Referring to FIGS. 7-9, the orifice geometry for one or more of the fluid nozzles 60 may have a polygonal shape; e.g., a rectangular shape (see FIG. 7), a star shape (see FIG. 8), a triangular shape (see FIG. 9), etc. Referring to FIGS. 5-8, the orifice geometry for one or more of the fluid nozzles 60 may have a regular shape. Herein, the term "regular" may describe an axisymmetric shape and/or a shape where all interior angles and sides respectively measure the same. Referring to FIGS. 9 and 10, the orifice geometry for one or more of the fluid nozzles 60 may have an irregular shape. Herein, the term "irregular" may describe a non-axisymmetric shape and/or a shape which includes interior angles and sides with different respective measurements. In generally, provide the nozzle orifice 68 with a non-circular orifice geometry may help to facilitate enhanced diffusion and/or perturbation of the fluid jet, particularly where the orifice geometry includes one or more interior corners (e.g., see FIGS. 7-10). The present disclosure, however, is not limited to the foregoing exemplary orifice geometries.

Figure 11:
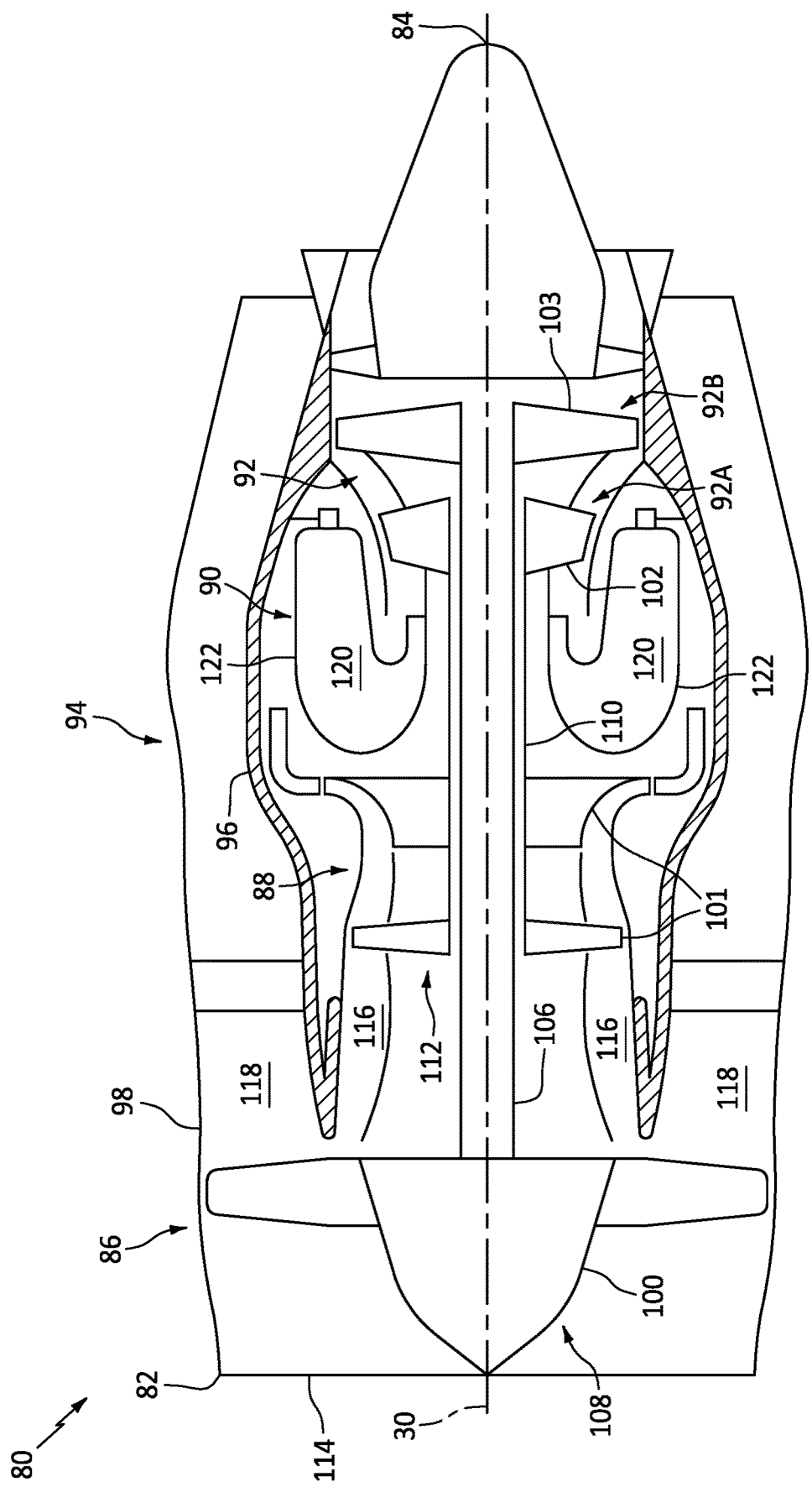
FIG. 11 is a side sectional schematic illustration of an aircraft propulsion system which may include the engine system of FIG. 1.

FIG. 11 is a side sectional schematic illustration of an aircraft propulsion system which may include the gas turbine engine and its engine assembly 20 (see FIG. 1). The gas turbine engine of FIG. 11 is configured as a turbofan gas turbine engine 80 ("turbofan engine"). This turbofan engine 80 extends axially along an axial centerline (e.g., the axis 30) from an upstream end 82 of the turbofan engine 80 to a downstream end 84 of the turbofan engine 80. The turbofan engine 80 includes a fan section 86, a compressor section 88, a combustor section 90 and a turbine section 92. The turbine section 92 of FIG. 11 includes a high pressure turbine (HPT) section 92A and a power turbine (PT) section 92B.

The engine sections 86, 88, 90, 92A and 92B are arranged within an engine housing 94. This engine housing 94 includes an inner case 96 (e.g., a core case) and an outer case 98 (e.g., a fan case). The inner case 96 may house one or more of the engine sections 88, 90, 92A and 92B; e.g., a core of the turbofan engine 80. The outer case 98 may house at least the fan section 86. The engine housing 94 may also include (or support) the stationary structure 24 (see FIG. 1) within the inner case 96.

Each of the engine sections 86, 88, 92A and 92B includes a respective bladed rotor 100-103. Each of these bladed engine rotors 100-103 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 100 is connected to and driven by the PT rotor 103 through a power turbine (PT) shaft 106. At least (or only) the fan rotor 100, the PT rotor 103 and the PT shaft 106 may collectively form a power turbine (PT) rotating assembly 108; e.g., a spool. The compressor rotor 101 is connected to and driven by the HPT rotor 102 through a high speed shaft 110. At least (or only) the compressor rotor 101, the HPT rotor 102 and the high speed shaft 110 may collectively form a high speed rotating assembly 112; e.g., a spool. At least one of these rotating assemblies 108, 112 may include or may otherwise be rotatable with the rotating structure 22 (see FIG. 1).

During operation of the turbofan engine 80, air enters the turbofan engine 80 through an airflow inlet 114 into the turbofan engine 80. This air is directed through the fan section 86 and into a core flowpath 116 and a bypass flowpath 118. The core flowpath 116 extends sequentially through the engine sections 88, 90, 92A and 92B; e.g., the engine core. The air within the core flowpath 116 may be referred to as "core air". The bypass flowpath 118 extends through a bypass duct which bypasses (e.g., is radially outboard of and extends along) the engine core. The air within the bypass flowpath 118 may be referred to as "bypass air".

The core air is compressed by the compressor rotor 101 and directed into a combustion chamber 120 of a combustor 122 in the combustor section 90. Fuel is injected into the combustion chamber 120 and mixed with the compressed core air to provide a fuel-air mixture. This fuel-air mixture is ignited and combustion products thereof flow through and sequentially cause the HPT rotor 102 and the PT rotor 103 to rotate. The rotation of the HPT rotor 102 drives rotation of the compressor rotor 101 and, thus, compression of the air received into the core flowpath 116. The rotation of the PT rotor 103 drives rotation of the fan rotor 100, which propels the bypass air through and out of the bypass flowpath 118. The propulsion of the bypass air may account for a majority of thrust generated by the turbofan engine 80, e.g., more than seventy-five percent (75%) of engine thrust. The turbofan engine 80 of the present disclosure, however, is not limited to the foregoing exemplary thrust ratio.

The engine assembly 20 may be included in various gas turbine engines other than the one described above. The engine assembly 20, for example, may be included in a geared gas turbine engine where a geartrain connects one or more shafts to one or more rotors in a fan section, a compressor section and/or any other engine section. Alternatively, the engine assembly 20 may be included in a gas turbine engine configured without a geartrain; e.g., a direct-drive gas turbine engine. The engine assembly 20 may be included in a gas turbine engine configured with a single spool, with two spools (e.g., see FIG. 11), or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU). The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
a rotating structure of the gas turbine engine rotatable about an axis, the rotating structure including a seal land, an engine shaft, and a plurality of fluid nozzles, the plurality of fluid nozzles including a first nozzle and a second nozzle, the seal land connected to and rotatable with the engine shaft;
a stationary structure of the gas turbine engine comprising a seal element, the seal element arranged with the seal land to form a seal assembly that seals an annular gap between the stationary structure and the rotating structure; and
a volume formed by and extending between the rotating structure and the stationary structure, the volume adjacent the seal element and the seal land;
each of the plurality of fluid nozzles configured to direct a respective fluid jet out from the rotating structure and into the volume,
wherein each of the plurality of fluid nozzles is mounted to and/or included as part of the rotating structure, and
wherein the first nozzle is configured to direct the respective fluid jet into the volume in a radial direction towards the seal assembly, and the second nozzle is configured to direct the respective fluid jet into the volume in an axial direction away from the seal assembly.

2. The assembly of claim 1, wherein each of the plurality of fluid nozzles is configured to direct the respective fluid jet into the volume to disrupt flow vortices within the volume.

3. The assembly of claim 1, wherein
at least one fluid nozzle of the plurality of fluid nozzles includes a nozzle passage and a nozzle orifice fluidly coupling the nozzle passage to the volume; and
the nozzle passage tapers as the nozzle passage extends longitudinally away from the nozzle orifice.

4. The assembly of claim 1, wherein at least one fluid nozzle of the plurality of fluid nozzles comprises a diffuser section configured to diffuse the fluid jet directed into the volume.

5. The assembly of claim 1, wherein
at least one fluid nozzle of the plurality of fluid nozzles includes a nozzle passage and a nozzle orifice fluidly coupling the nozzle passage to the volume; and
the nozzle passage extends longitudinally along a centerline to the nozzle orifice, and at least a portion of the centerline that extends longitudinally to the nozzle orifice is curved.

6. The assembly of claim 1, wherein
at least one fluid nozzle of the plurality of fluid nozzles includes a nozzle passage and a nozzle orifice fluidly coupling the nozzle passage to the volume; and
the nozzle orifice has an elongated cross-sectional geometry.

7. The assembly of claim 1, wherein
at least one fluid nozzle of the plurality of fluid nozzles includes a nozzle passage and a nozzle orifice fluidly coupling the nozzle passage to the volume; and
the nozzle orifice has a polygonal cross-sectional geometry.

8. The assembly of claim 1, wherein
at least one fluid nozzle of the plurality of fluid nozzles includes a nozzle passage and a nozzle orifice fluidly coupling the nozzle passage to the volume; and
the nozzle orifice has an irregular cross-sectional geometry.

9. The assembly of claim 1, further comprising:
a lubricant source fluidly coupled to at least one fluid nozzle of the plurality of fluid nozzles;
the fluid jet comprising a lubricant jet.

10. The assembly of claim 1, further comprising:
an air source fluidly coupled to at least one fluid nozzle of the plurality of fluid nozzles;
the fluid jet comprising an air jet.

11. The assembly of claim 1, wherein the volume comprises an air passage extending to the seal assembly.

12. The assembly of claim 1, wherein the volume comprises an air cavity.

13. The assembly of claim 1, further comprising:
a bearing rotatably coupling the rotating structure to the stationary structure;
the volume comprising a bearing compartment in which the bearing is disposed.

14. The assembly of claim 1, further comprising a second plurality of fluid nozzles, each of the fluid nozzles of the second plurality of fluid nozzles mounted to and/or included as part of the stationary structure, and each of the fluid nozzles of the second plurality of fluid nozzles configured to direct a respective fluid jet out from the stationary structure and into the volume, wherein the second plurality of fluid nozzles includes a third nozzle and a fourth nozzle, the third nozzle configured to direct the respective fluid jet into the volume radially towards the seal assembly, and the fourth nozzle configured to direct the respective fluid jet into the volume axially towards from the seal assembly.

15. An assembly for a gas turbine engine, comprising:

a rotating structure of the gas turbine engine rotatable about an axis, the rotating structure comprising a seal land;

a stationary structure of the gas turbine engine comprising a seal element, the seal element arranged with the seal land to form a seal assembly that seals an annular gap between the stationary structure and the rotating structure;

a volume formed by and extending between the rotating structure and the stationary structure, the volume adjacent the seal element and the seal land, wherein the volume comprises an air passage extending to the seal assembly; and a plurality of fluid nozzles, the plurality of fluid nozzles including a first nozzle and a second nozzle, each fluid nozzle of the plurality of fluid nozzles including a respective nozzle passage and a respective nozzle orifice, each fluid nozzle of the plurality of fluid nozzles configured to direct a fluid out of the respective nozzle passage, through the respective nozzle orifice, and into the volume as a diffuse flow of the fluid, wherein the first nozzle and the second nozzle are mounted to and/or included as part of the rotating structure, and wherein the first nozzle is configured to direct the respective fluid into the volume in a radial direction towards the seal assembly, and the second nozzle is configured to direct the fluid into the volume in an axial direction away from the seal assembly.

16. The assembly of claim 15, wherein a width of each respective nozzle passage expands as the nozzle passage extends longitudinally towards the respective nozzle orifice.

17. The assembly of claim 15, wherein each respective nozzle orifice has a non-circular cross-sectional geometry.

18. An assembly for a gas turbine engine, comprising:

a rotating structure of the gas turbine engine rotatable about an axis, the rotating structure comprising a seal land;

a stationary structure of the gas turbine engine comprising a seal element, the seal element arranged with the seal land to form a seal assembly that seals an annular gap between the stationary structure and the rotating structure;

a volume formed by and extending between the rotating structure and the stationary structure, the volume adjacent the seal element and the seal land, wherein the volume comprises an air passage extending to the seal assembly; and a plurality of fluid nozzles, the plurality of fluid nozzles including a first nozzle and a second nozzle, each of the first nozzle and the second nozzle including a respective nozzle passage and a respective nozzle orifice, each of the first nozzle and the second nozzle configured to direct a fluid out of the respective nozzle passage, through the respective nozzle orifice, and into the volume as a turbulent flow of the fluid, wherein each of the first nozzle and the second nozzle is configured and rotatable with the rotating structure, and wherein the first nozzle is configured to direct the fluid into the volume in a radial direction towards the seal assembly, and the second nozzle is configured to direct the fluid into the volume in an axial direction away from the seal assembly.

19. The assembly of claim 18, wherein each respective nozzle passage follows a curved trajectory to each respective nozzle orifice.

\* \* \* \* \*